United States Patent
Al-Ghamdi

(10) Patent No.: US 9,844,739 B2
(45) Date of Patent: Dec. 19, 2017

(54) VERTICAL PIPE STRUCTURE FOR WATER AND ENERGY HARVESTING

(71) Applicant: Nidhal Saad Al-Ghamdi, Dammam (SA)

(72) Inventor: Nidhal Saad Al-Ghamdi, Dammam (SA)

( * ) Notice: Subject to any disclaimer, the term of this patent is extended or adjusted under 35 U.S.C. 154(b) by 346 days.

(21) Appl. No.: 14/810,411

(22) Filed: Jul. 27, 2015

(65) Prior Publication Data

US 2017/0033676 A1 Feb. 2, 2017

(51) Int. Cl.
| | |
|---|---|
| *G21D 7/02* | (2006.01) |
| *F02B 63/04* | (2006.01) |
| *F03B 13/08* | (2006.01) |
| *B01D 5/00* | (2006.01) |
| *E03B 3/28* | (2006.01) |

(52) U.S. Cl.
CPC .......... *B01D 5/009* (2013.01); *B01D 5/0012* (2013.01); *E03B 3/28* (2013.01)

(58) Field of Classification Search
CPC .................................. H02K 7/18; H02K 3/28
USPC ...................................... 310/11; 290/1 R, 54
See application file for complete search history.

(56) References Cited

U.S. PATENT DOCUMENTS

| | | | | |
|---|---|---|---|---|
| 3,554,670 | A | * | 1/1971 | Starck et al. ........ B22D 39/006 198/619 |
| 3,591,419 | A | * | 7/1971 | Hamilton ................ H01M 8/22 429/501 |
| 3,894,393 | A | | 7/1975 | Carlson |
| 3,953,971 | A | | 5/1976 | Parker |
| 4,146,372 | A | | 3/1979 | Groth et al. |
| 4,318,275 | A | | 3/1982 | Brown et al. |
| 5,873,249 | A | | 2/1999 | Alkhamis |
| 2010/0077750 | A1 | | 4/2010 | Russo |
| 2014/0096520 | A1 | | 4/2014 | Paya Diaz |

FOREIGN PATENT DOCUMENTS

| | | |
|---|---|---|
| CN | 1304009 A | 7/2001 |
| CN | 202152916 U | 2/2012 |
| FR | 2 541 986 | 9/1984 |

* cited by examiner

*Primary Examiner* — Jose Gonzalez Quinones
(74) *Attorney, Agent, or Firm* — Richard C. Litman

(57) ABSTRACT

The vertical pipe structure for water and energy harvesting is an artificial structure formed from concentric sets or rings of pipes having sufficient height such that atmospheric water vapor will condense on upper ends thereof. Water vapor condensing on external faces of the pipes flows downward, under the force of gravity, for collection in at least one reservoir. Water vapor condensing on internal faces of the pipes also flows downward within the concentric sets or rings of pipes for collection in an underground chamber. At least one hydrodynamic generator or the like is provided on the exterior of the artificial structure, such that water flowing thereover may be used for the generation of power.

10 Claims, 1 Drawing Sheet

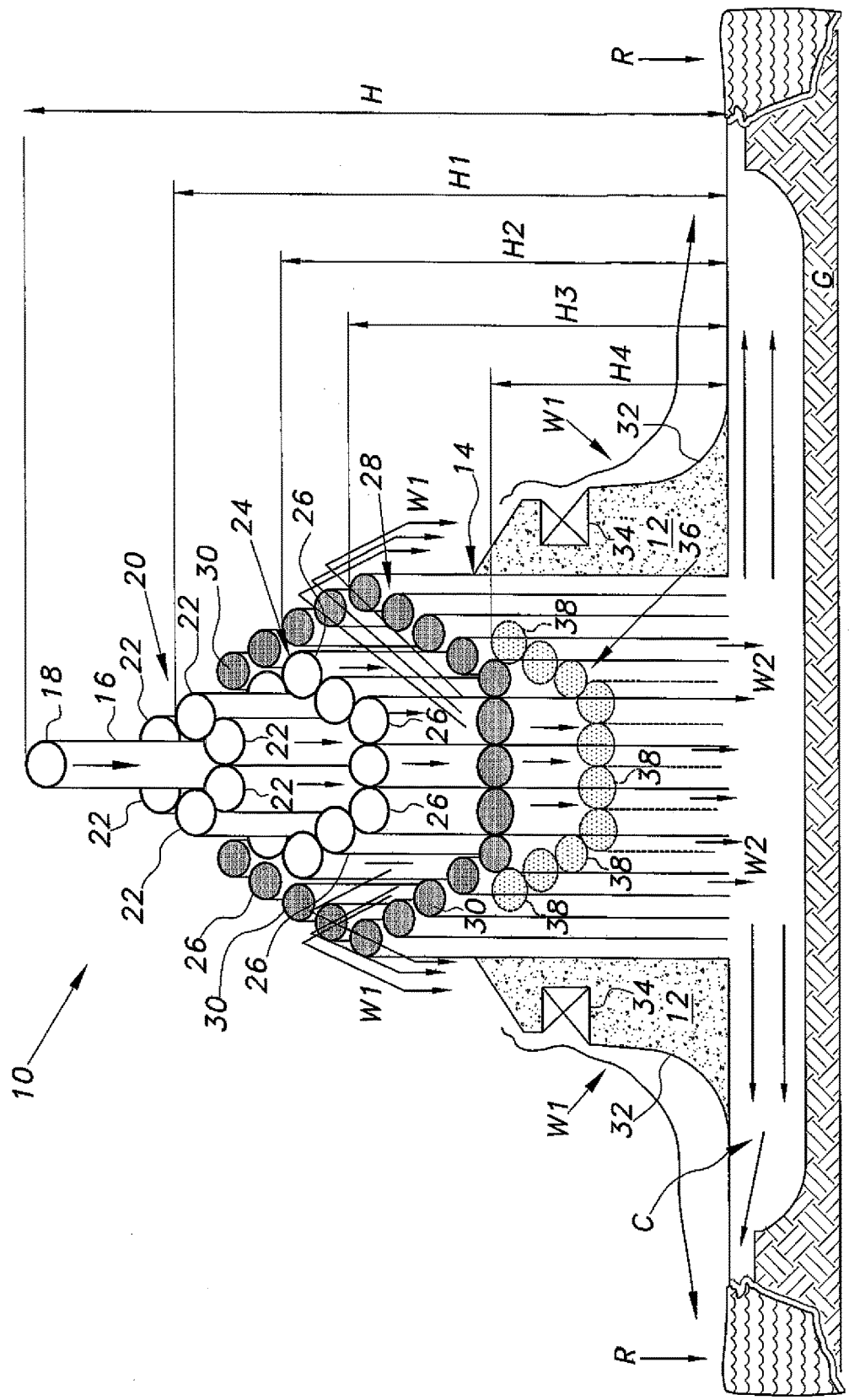

VERTICAL PIPE STRUCTURE FOR WATER AND ENERGY HARVESTING

BACKGROUND OF THE INVENTION

1. Field of the Invention

The present invention relates to the production of potable water, and particularly to an artificial vertical pipe structure for producing potable water from the condensation of atmospheric water vapor, and for generating usable power from the gravity flow of the condensed water.

2. Description of the Related Art

Water recovery in deserts and in other arid climates is of great importance. Although the atmosphere contains large quantities of pure water vapor, water vapor typically does not condense in the atmosphere below a height from the surface of approximately two kilometers, thus making it difficult to artificially extract water vapor from the air. Although dehumidifiers, condensers and the like can operate near the surface, there is little humidity at low altitudes in deserts and other arid climates. Thus, the yield of potable water is very low. Cloud seeding and similar techniques may be used in the cloud-forming regions of the troposphere to artificially stimulate precipitation, but such techniques have unproven efficacy and typically have a negative impact on the environment, particularly through the unwanted precipitation of heavy metals along with the desired water. It would obviously be desirable to provide an artificial method of extracting atmospheric moisture that has little to no negative impact on the environment. Thus, a vertical pipe structure for water and energy harvesting solving the aforementioned problems is desired.

SUMMARY OF THE INVENTION

The vertical pipe structure for water and energy harvesting is an artificial structure formed from concentric sets or rings of pipes having sufficient height such that atmospheric water vapor will condense on upper ends of the pipes. Water vapor condensing on external faces of the pipes flows downward, under the force of gravity, for collection in at least one reservoir. Water vapor condensing on internal faces of the pipes also flows downward, within the concentric sets or rings of pipes, for collection in an underground chamber. At least one hydrodynamic generator or the like is provided on the exterior of the artificial structure such that water flowing thereover may be used for the generation of power.

The vertical pipe structure for water and energy harvesting includes an annular support defining a central passage and having at least one sloped side surface and a lower surface adapted for positioning on a support surface, such as the ground. A central pipe having opposed open upper and lower ends is vertically oriented and positioned substantially centrally with respect to the central passage defined through the annular support. A set of first pipes is circumferentially arrayed about the central pipe. Each of the first pipes has opposed open upper and lower ends, and each first pipe has a first height associated therewith. The first height is less than a height of the central pipe.

A set of second pipes is circumferentially arrayed about the set of first pipes. Each second pipe also has opposed open upper and lower ends, and each second pipe has a second height associated therewith, which is less than the first height. The height of the central pipe, the first height and the second height are each sufficient such that the respective open upper ends of the central pipe, the set of first pipes and the set of second pipes act as nucleation sites for condensation of atmospheric water vapor.

A set of third pipes is further circumferentially arrayed about the set of second pipes. Each third pipe has opposed upper and lower ends, but the upper ends thereof are each closed. Each third pipe has a third height associated therewith, which is less than the second height. In use, the condensation of atmospheric water vapor on respective external faces of the central pipe, the set of first pipes and the set of second pipes flows under gravity over the closed upper ends of the set of third pipes and down the at least one sloped side surface of the annular support for collection in the at least one reservoir for use as potable water. The condensation of atmospheric water vapor on respective internal faces of the central pipe, the set of first pipes and the set of second pipes flows under gravity therethrough for collection in a collection chamber defined beneath the annular support and beneath the support surface (i.e., below the ground surface). The collection chamber is preferably in fluid communication with the at least one reservoir.

Additionally, a set of fourth pipes may be circumferentially arrayed between the set of second pipes and the set of third pipes. Each of the fourth pipes has opposed upper and lower ends, the upper end of each fourth pipe being closed. Each of the fourth pipes has a fourth height associated therewith, where the fourth height is less than the third height. Thus, the external faces of the set of second pipes and the set of third pipes as well as the upper ends of the set of fourth pipes define an annular recess for water collection therein. Once the water collected in the annular recess reaches the third height of the set of third pipes, the water spills over and flows down the at least one sloped surface of the annular support.

These and other features of the present invention will become readily apparent upon further review of the following specification and drawing.

BRIEF DESCRIPTION OF THE DRAWINGS

The sole drawing FIGURE diagrammatically illustrates a vertical pipe structure for water and energy harvesting according to the present invention.

DETAILED DESCRIPTION OF THE PREFERRED EMBODIMENTS

As shown in the sole drawing FIGURE, the vertical pipe structure for water and energy harvesting 10 includes an annular support 12, which is constructed on a surface S, which may be the surface of the ground G. As will be described in greater detail below, the vertical pipe structure 10 extracts potable water from the atmosphere, typically from heights above sea level of two kilometers or more. Thus, the surface S is preferably positioned high above sea level, such as on top of an existing mountain. The annular support 12 defines an internal passage 14 for receiving a radially-arrayed set of pipes.

A central pipe 16 has the greatest height H of the radially-arrayed set of pipes and has an open upper end 18. As shown, the central pipe 16 extends vertically from the center of the internal passage 14 of the annular support 12. The upper end 18 of the central pipe 16 provides a nucleation site for atmospheric moisture to condense. Thus, the upper end 18 is preferably positioned at a height of approximately two kilometers or more above sea level. It should be understood that, depending on the altitude of the upper end 18, water in the form of ice may also crystalize thereon, and this ice may either melt thereon or fall and melt at lower altitudes, thus producing usable potable water to be collected, as described in greater detail below.

Surrounding the central pipe 16 is a first set or ring of pipes 20, with each pipe of the first ring 20 also having an open upper end 22. Although only six such pipes are shown in the first ring 20, it should be understood that any suitable number of pipes may be provided to completely surround the central pipe 16. As shown, the open upper ends 22 of the first ring of pipes 20 are positioned at a lower altitude than the open upper end 18 of central pipe 16, although the open upper ends 22 of the first ring 20 are preferably also positioned at a height H1 that provides nucleation sites for atmospheric vapor to condense thereon.

Surrounding the first ring of pipes 20 is a second set or ring of pipes 24. Each pipe of the second ring 24 also has an open upper end 26. It should be understood that any suitable number of pipes may be provided to completely surround the first ring of pipes 20. As shown, the open upper ends 26 of the second ring of pipes 24 are positioned at a lower altitude than open upper ends 22 of the first ring of pipes 20, although the open upper ends 26 of the second ring 24 are also preferably positioned at a height H2 that provides nucleation sites for atmospheric vapor to condense thereon.

A third set or ring of pipes 28 surrounds the second ring of pipes 24. It should be understood that any suitable number of pipes may be provided to completely surround the second ring of pipes 24. Each pipe of the third ring of pipes 28 has a closed upper end 30, providing a surface for condensed water vapor to collect and fall. As shown, the closed upper ends 30 of the third ring of pipes 28 are positioned at a lower altitude than open upper ends 26 of the second ring of pipes 24, i.e., the height 113 of the third set or ring of pipes 28 is less than the height H2 of the second set or ring of pipes 24, which is less than height H1 of the first set or ring of pipes 20, which is less than the height H of the central pipe 16.

As shown, the annular support 12 preferably has sloping side surfaces 32. Thus, water vapor condensing and flowing, under the force of gravity, on the exterior faces of central pipe 16, the first ring of pipes 20 and the second ring of pipes 22 flows over the closed upper ends 30 of the third ring of pipes 28, and then continues to fall and flow as a first water stream W1 onto the sloped surfaces 32 of the annular support 12, where it may then be collected as potable water in one or more reservoirs R. Additionally, as shown, one or more hydrodynamic power plants or generators 34 may be mounted in or on the annular support 12, adjacent to the sloping side surfaces 32, thus allowing the first water stream W1 to drive the one or more hydrodynamic power plants or generators 34 to generate usable electrical and/or mechanical power.

Additionally, water vapor condensing and flowing, under the force of gravity, on the internal faces of the central pipe 16, the first ring of pipes 20 and the second ring of pipes 22 falls through the central pipe 16, the first ring of pipes 20, and the second ring of pipes 22 as a second water stream W2, which collects in an underground chamber C. The underground chamber C is located below the surface S and is constructed beneath the annular support 12. The lower ends of the central pipe 16, the first ring of pipes 20, and the second ring of pipes 22 feed directly into the underground chamber C, and the underground chamber C is preferably in communication with the one or more reservoirs R, thus allowing for collection of the potable second water stream W2.

Additionally, as shown, a fourth set or ring of pipes 36 may be radially positioned between the second set or ring of pipes 24 and the third set or ring of pipes 28. Each pipe in the fourth set or ring of pipes 36 has a closed upper end 38, and the height H4 of each pipe in the fourth ring of pipes 36 is less than the height H3 of the third ring of pipes 28, as shown. Thus, the closed upper ends 38 and the exterior faces of second ring of pipes 24 and the third ring of pipes 28 define an annular recess for water W1 to collect in as it flows from the exterior faces of the central pipe 16, the first ring of pipes 20, and the second ring of pipes 22. Once the water W1 collected therein reaches the height H3 of the closed upper ends 30 of the third ring of pipes 28, the water W1 flows over the closed upper ends 30, and continues to flow down the sloping sides 32 of annular support 12.

It is to be understood that the present invention is not limited to the embodiments described above, but encompasses any and all embodiments within the scope of the following claims.

I claim:

1. A vertical pipe structure for water and energy harvesting, comprising:

an annular support defining a central passage and having at least one sloped side surface and a lower surface adapted for positioning on a support surface;

a central pipe having opposed open upper and lower ends, the central pipe being vertically oriented and positioned substantially centrally with respect to the central passage defined through the annular support;

a set of first pipes circumferentially arrayed about the central pipe, each of the first pipes having opposed open upper and lower ends, each of the first pipes having a first height associated therewith, the first height being less than a height of the central pipe;

a set of second pipes circumferentially arrayed about the set of first pipes, each of the second pipes having opposed open upper and lower ends, each of the second pipes having a second height associated therewith, the second height being less than the first height, whereby the height of the central pipe, the first height and the second height are each sufficient such that the respective open upper ends of the central pipe, the set of first pipes and the set of second pipes act as nucleation sites for condensation of atmospheric water vapor; and a set of third pipes circumferentially arrayed about the set of second pipes, each of the third pipes having opposed upper and lower ends, the upper end thereof being closed, each of the third pipes having a third height associated therewith, the third height being less than the second height;

wherein condensation of atmospheric water vapor on respective external faces of the central pipe, the set of first pipes and the set of second pipes flows under gravity over the upper ends of the set of third pipes and down the at least one sloped side surface of the annular support for collection in at least one reservoir, and the condensation of atmospheric water vapor on respective internal faces of the central pipe, the set of first pipes and the set of second pipes flows under gravity therethrough for collection in a collection chamber defined beneath the annular support and beneath the support surface.

2. The vertical pipe structure as recited in claim 1, wherein the collection chamber is in communication with the at least one reservoir.

3. The vertical pipe structure as recited in claim 1, further comprising at least one hydrodynamic generator mounted on the at least one sloped side surface for generating power from condensed water flowing thereover.

4. The vertical pipe structure as recited in claim 1, further comprising a set of fourth pipes circumferentially arrayed between said set of second pipes and said set of third pipes, each pipe of the fourth set of pipes having opposed upper and lower ends, the upper end thereof being closed, each of the fourth pipes having a fourth height associated therewith, the fourth height being less than the third height, whereby the external faces of said set of second pipes and said set of third pipes and the upper ends of the set of fourth pipes define an annular recess for water collection therein.

5. A vertical pipe structure for water and energy harvesting, comprising:
an annular support defining a central passage and having at least one sloped side surface and a lower surface adapted for positioning on a support surface;
a central pipe having opposed open upper and lower ends, the central pipe being vertically oriented and positioned substantially centrally with respect to the central passage defined through the annular support;
a set of first pipes circumferentially arrayed about the central pipe, each of the first pipes having opposed open upper and lower ends, each of the first pipes having a first height associated therewith, the first height being less than a height of the central pipe;
a set of second pipes circumferentially arrayed about the set of first pipes, each of the second pipes having opposed open upper and lower ends, each of the second pipes having a second height associated therewith, the second height being less than the first height, whereby the height of the central pipe, the first height and the second height are each sufficient such that the respective open upper ends of the central pipe, the set of first pipes and the set of second pipes act as nucleation sites for condensation of atmospheric water vapor;
a set of third pipes circumferentially arrayed about the set of second pipes, each of the third pipes having opposed upper and lower ends, the upper end thereof being closed, each of the third pipes having a third height associated therewith, the third height being less than the second height; and
a set of fourth pipes circumferentially arrayed between the set of second pipes and the set of third pipes, each of the fourth pipes having opposed upper and lower ends, the upper end thereof being closed, each of the fourth pipes having a fourth height associated therewith, the fourth height being less than the third height, whereby the external faces of the set of second pipes and the set of third pipes and the upper ends of the set of fourth pipes define an annular recess for water collection therein;
wherein condensation of atmospheric water vapor on respective external faces of the central pipe, the set of first pipes, and the set of second pipes flows under gravity over the upper ends of the set of third pipes and down the at least one sloped side surface of the annular support for collection in at least one reservoir, and the condensation of atmospheric water vapor on respective internal faces of the central pipe, the set of first pipes and the set of second pipes flows under gravity therethrough for collection in a collection chamber defined beneath the annular support and beneath the support surface.

6. The vertical pipe structure as recited in claim 5, wherein the collection chamber is in communication with the at least one reservoir.

7. The vertical pipe structure as recited in claim 5, further comprising at least one hydrodynamic generator mounted on the at least one sloped side surface for generating power from condensed water flowing thereover.

8. A vertical pipe structure for water and energy harvesting, comprising:
an annular support defining a central passage and having at least one sloped side surface and a lower surface adapted for positioning on a support surface;
a central pipe having opposed open upper and lower ends, the central pipe being vertically oriented and positioned substantially centrally with respect to the central passage defined through the annular support;
a set of first pipes circumferentially arrayed about the central pipe, each of the first pipes having opposed open upper and lower ends, each of the first pipes having a first height associated therewith, the first height being less than a height of the central pipe;
a set of second pipes circumferentially arrayed about the set of first pipes, each of the second pipes having opposed open upper and lower ends, each of the second pipes having a second height associated therewith, the second height being less than the first height, whereby the height of the central pipe, the first height, and the second height are each sufficient such that the respective open upper ends of the central pipe, the set of first pipes and the set of second pipes act as nucleation sites for condensation of atmospheric water vapor;
a set of third pipes circumferentially arrayed about the set of second pipes, each of the third pipes having opposed upper and lower ends, the upper end thereof being closed, each of the third pipes having a third height associated therewith, the third height being less than the second height; and
at least one hydrodynamic generator mounted on the at least one sloped side surface for generating power from water flowing thereover;
wherein condensation of atmospheric water vapor on respective external faces of the central pipe, the set of first pipes and the set of second pipes flows under gravity over the upper ends of the set of third pipes and down the at least one sloped side surface of the annular support for collection in at least one reservoir, and the condensation of atmospheric water vapor on respective internal faces of the central pipe, the set of first pipes and the set of second pipes flows under gravity therethrough for collection in a collection chamber defined beneath the annular support and beneath the support surface.

9. The vertical pipe structure as recited in claim 8, wherein the collection chamber is in communication with the at least one reservoir.

10. The vertical pipe structure as recited in claim 8, further comprising a set of fourth pipes circumferentially arrayed between said set of second pipes and said set of third pipes, each of the fourth pipes having opposed upper and lower ends, the upper end thereof being closed, each of the fourth pipes having a fourth height associated therewith, the fourth height being less than the third height, whereby the external faces of said set of second pipes and said set of third pipes and the upper ends of the set of fourth pipes define an annular recess for water collection therein.

\* \* \* \* \*